US010002194B2

(12) United States Patent
Russell

(10) Patent No.: US 10,002,194 B2
(45) Date of Patent: Jun. 19, 2018

(54) EVENT LOCATION WITH SOCIAL NETWORK INTEGRATION

(71) Applicant: James Neil Russell, Tulsa, OK (US)

(72) Inventor: James Neil Russell, Tulsa, OK (US)

(*) Notice: Subject to any disclaimer, the term of this patent is extended or adjusted under 35 U.S.C. 154(b) by 276 days.

(21) Appl. No.: 13/724,300

(22) Filed: Dec. 21, 2012

(65) Prior Publication Data
US 2013/0166385 A1 Jun. 27, 2013

Related U.S. Application Data

(60) Provisional application No. 61/579,632, filed on Dec. 22, 2011.

(51) Int. Cl.
G06Q 30/02 (2012.01)
G06Q 10/10 (2012.01)
G06Q 99/00 (2006.01)
G06F 17/30 (2006.01)
G06Q 50/00 (2012.01)

(52) U.S. Cl.
CPC .... *G06F 17/30867* (2013.01); *G06F 17/3087* (2013.01); *G06Q 30/0281* (2013.01); *G06Q 50/01* (2013.01); *G06Q 30/0261* (2013.01)

(58) Field of Classification Search
CPC ............................ G06Q 50/01; G06Q 30/0281
USPC .................................................. 705/1.1–912
See application file for complete search history.

(56) References Cited

U.S. PATENT DOCUMENTS 8,055,675 B2 * 11/2011 Higgins et al. ............... 707/769
8,549,412 B2 * 10/2013 Brezina et al. ............... 715/751
8,930,204 B1 * 1/2015 Igoe et al. ........................ 705/2
9,747,285 B1 * 8/2017 Laufer ..................... G06F 17/30
2004/0203892 A1 * 10/2004 Cole ....................... G06Q 30/02
455/456.1
2008/0320078 A1 12/2008 Feldman
2009/0027223 A1 1/2009 Hill
2009/0298514 A1 * 12/2009 Ullah ......................... 455/456.5
2010/0036912 A1 2/2010 Rao
2010/0287048 A1 * 11/2010 Ramer et al. .............. 705/14.46
(Continued)

FOREIGN PATENT DOCUMENTS

WO 1999040740 A2 8/1999

OTHER PUBLICATIONS

Casabona, "Smart Places App by MD Mobile," Android.appstorm.net, Oct. 19, 2011, http://android.appstorm.net/reviews/communication/smartplaces-ups-facebooks-checkin-game/.
(Continued)

*Primary Examiner* — Jonathan P Ouellette
(74) *Attorney, Agent, or Firm* — Blueshift IP, LLC; Robert Plotkin

(57) ABSTRACT

An event location system identifies events of interest to a user. The system uses a filter and location associated with the user to search a database of events, thereby producing an event result set representing current events near the user's location that match the user's filter. The filter may include one or more criteria, such as criteria obtained from one or more social networking profiles of the user. The location may be identified automatically, such as by using a Global Positioning System (GPS) module. The system may automatically update the event result set over time and as the user's location changes so that the event result set is always up-to-date and reflects the user's current location.

42 Claims, 5 Drawing Sheets

(56) References Cited

U.S. PATENT DOCUMENTS

| | | | |
|---|---|---|---|
| 2012/0102013 A1* | 4/2012 | Martini | G06F 17/3087 707/706 |
| 2012/0150960 A1* | 6/2012 | Nalawade | 709/204 |
| 2012/0221687 A1* | 8/2012 | Hunter et al. | 709/219 |
| 2013/0073374 A1* | 3/2013 | Heath | 705/14.39 |

OTHER PUBLICATIONS

Valla, "Exploiting context for automatic check-in suggestion and validation," Pervasive Computing and Communications Workshops (PERCOM Workshops), pp. 348-351 Issue Date: Mar. 21-25, 2011.
Miluzzo et al, "Sensing Meets Mobile Social Networks: The Design, Implementation and Evaluation of the CenceMe Application," In Proc. of 6th ACM Conference on Embedded Networked Sensor Systems (SenSys '08). Raleigh, NC, USA, Nov. 5-7, 2008.
Foursquare API, "Foursquare.com—Auto Check in Lite," Accessed Nov. 12, 2011, http://webcache.googleusercontent.com/search?q=cache:f9byaH2E8U0J:https://foursquare.com/app/auto_check_in_lite+&cd=1&hl=en&ct=clnk&gl=us&client=firefox-a.
Foursquare API, "Foursquare.com—Voidsquare," Accessed Nov. 12, 2011, https://foursquare.com/app/voidsquare.
Facebook, Event Locator for Facebook, http://www.eventlocatorforfacebook.com/ Accessed Dec. 19, 2011.
Apple, "Screenshots of "Meet Gatsby" iPhone App" Accessed Nov. 19, 2011.
MeetGatsby.com web site, Accessed Jan. 23, 2013.

\* cited by examiner

EVENT LOCATION WITH SOCIAL NETWORK INTEGRATION

CROSS-REFERENCE TO RELATED APPLICATIONS

This application claims priority from the following co-pending U.S. Prov. Pat. App. Ser. No. 61/579,632, filed on Dec. 22, 2011, entitled, "Event Location with Social Network Integration," which is hereby incorporated by reference herein.

BACKGROUND

Users of computing devices and communication devices often use such devices to find events of interest to them. For example, Eventful (which may be accessed through a web site or an application, such as the Eventful app for the Apple iPhone) enables users to find events of interest to them using a desktop computer, laptop computer, smartphone, or other device.

SUMMARY

An event location system identifies events of interest to a user. The system uses a filter and location associated with the user to search a database of events, thereby producing an event result set representing current events near the user's location that match the user's filter. The filter may include one or more criteria, such as criteria obtained from one or more social networking profiles of the user. The location may be identified automatically, such as by using a Global Positioning System (GPS) module. The system may automatically update the event result set over time and as the user's location changes so that the event result set is always up-to-date and reflects the user's current location.

For example, one embodiment of the present invention is directed to a method comprising: (A) generating filter data associated with a user, comprising receiving first criterion data from a social networking profile associated with the user, wherein the first criterion data represents a first criterion; (B) identifying first location data representing a first location associated with the user; (C) identifying first event data representing a first plurality of events; and (D) generating first event result set data, based on the filter data, the first location data, the first criterion data, and the first plurality of events, wherein the first event result set data representing a first event result set, wherein the first event result set includes at least one first event in the first plurality of events that satisfies the first criterion and that is near the first location associated with the user.

Another embodiment of the present invention is directed to a method comprising: (A) generating filter data associated with a user, comprising receiving first criterion data from a social networking profile associated with the user, wherein the first criterion data represents a first criterion; (B) deriving a second criterion from the first criterion; (C) storing second criterion data representing the second criterion in the filter data to produce modified filter data including the first criterion data and the second criterion data; (D) identifying first location data representing a first location associated with the user; (E) identifying first event data representing a first plurality of events; and (F) generating first event result set data, based on the filter data, the first location data, the first criterion data, and the first plurality of events, wherein the first event result set data representing a first event result set, wherein the first event result set includes at least one first event in the first plurality of events that is near the first location associated with the user and that satisfies at least one of the first criterion and the second criterion.

Other features and advantages of various aspects and embodiments of the present invention will become apparent from the following description and from the claims.

DETAILED DESCRIPTION

Existing event-location systems, such as Eventful, may be useful for finding events that are of interest to a user. Such systems, however, have a variety of limitations. For example, such systems maintain a profile for each user that stores information about the user's interests and category choices. Such systems may require the user to manually enter and manually submit a variety of information, such as the user's current location and event preferences, into the system for storage in the user's profile. As a result, the process of finding relevant events can be tedious and time-consuming. As another example, systems that require the user to enter the user's current location (e.g., in the form of a zip code or street address) are limited to providing listings of events that occur within the vicinity of the location manually specified by the user. As a result, such systems are not equipped to provide event listings that are based on the user's location as automatically identified by the system itself, such as by using a Global Positioning System (GPS) module or other location-identification module.

Figure 1:
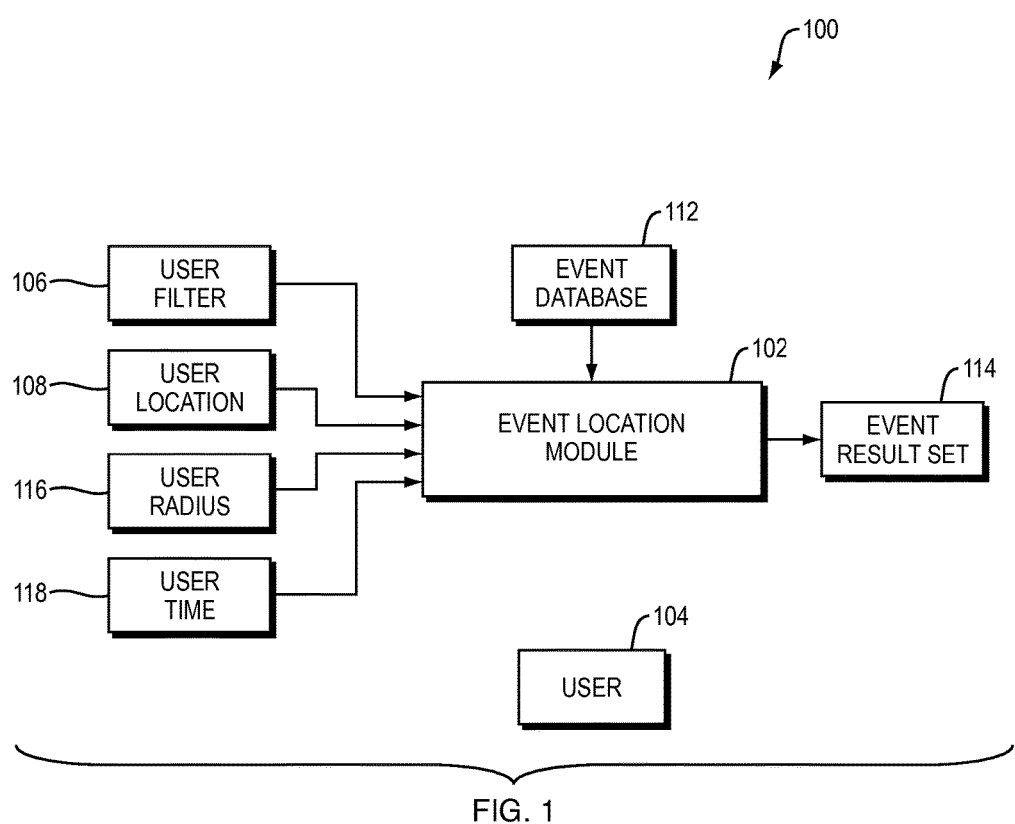
FIG. 1 is a dataflow diagram of an event-location system according to one embodiment of the present invention.
Figure 2:
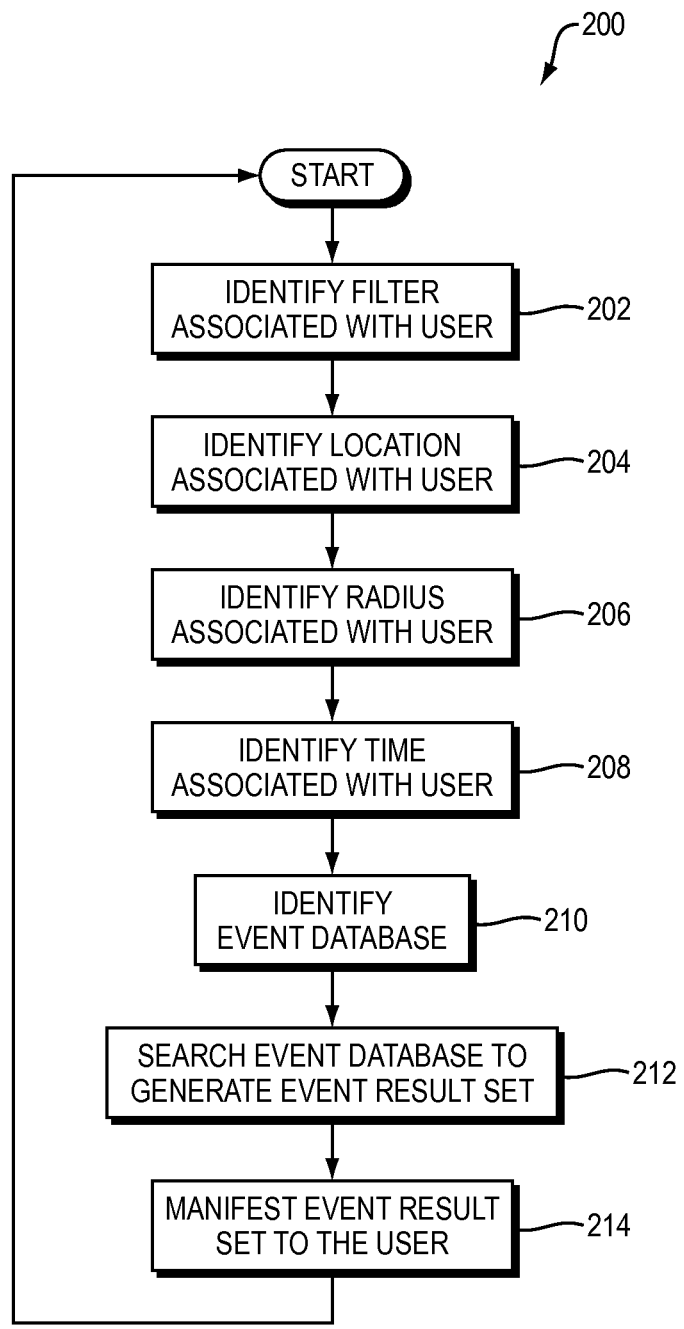
FIG. 2 is a flowchart of a method performed by the system of FIG. 1 according to one embodiment of the present invention.

Embodiments of the present invention overcome this and other limitations of existing event-location systems. For example, referring to FIG. 1, a dataflow diagram is shown of an event-location system implemented according to one embodiment of the present invention. Referring to FIG. 2, a flowchart is shown of a method 200 that is performed by the system 100 of FIG. 1 according to one embodiment of the present invention.

The system 100 includes an event location module 102. In general, and as will be described in more detail below, the event location module 102 identifies events of interest to a user 104. The event location module 102 uses a filter 106 associated with the user 104 and a location 108 associated with the user 104 to search a database of events 112, and thereby to generate an event result set 114 containing one or more records representing events that match the user's filter 106 and which are located at or near the user's location 108.

The filter 106 may include one or more criteria, such as criteria obtained from one or more social networking profiles of the user 104.

Figure 3:
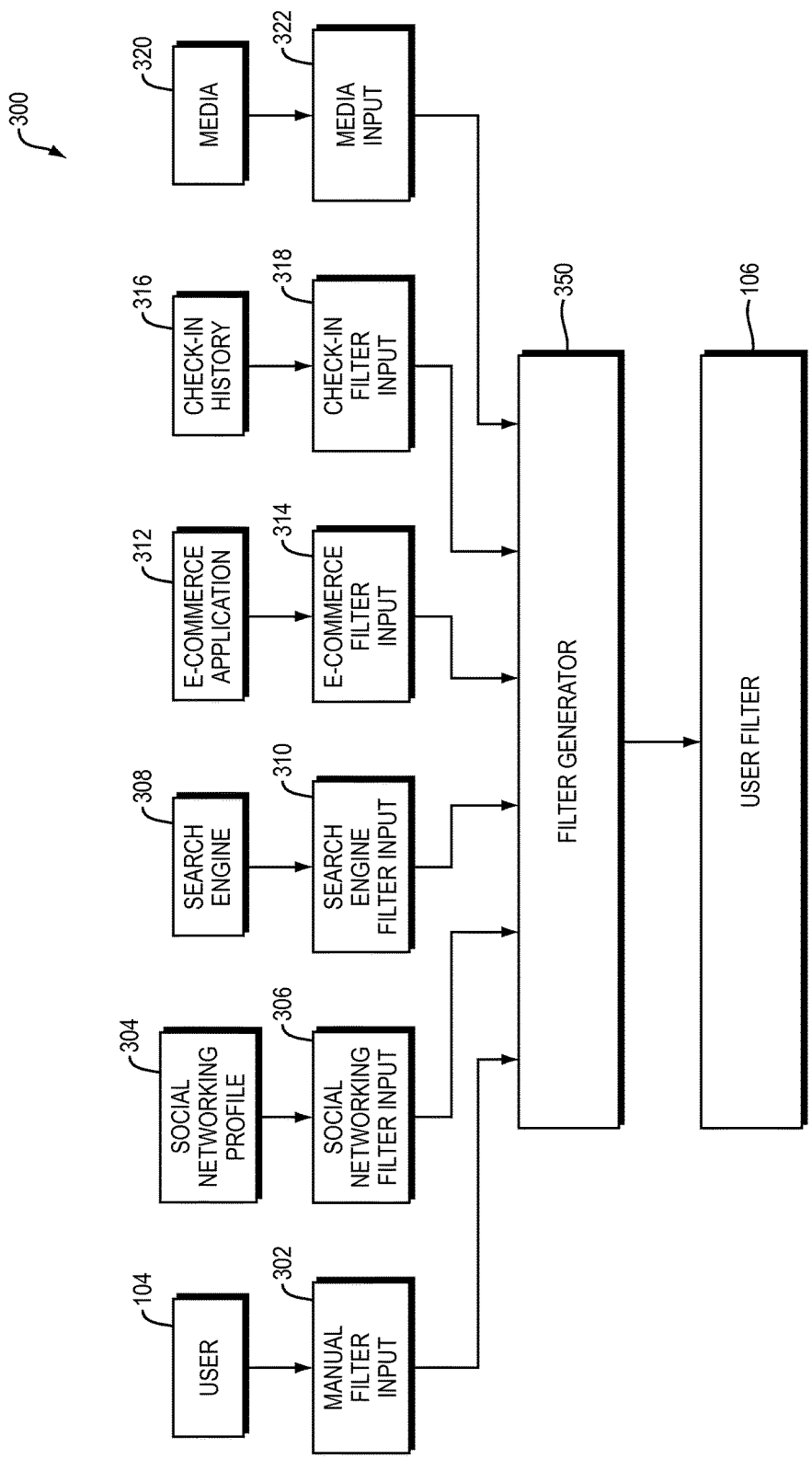
FIG. 3 is a dataflow diagram of a system for identifying the filter of FIG. 1 according to one embodiment of the present invention.

More specifically, the event location module 102 identifies (e.g., generates) the filter 106 associated with the user 104 (FIG. 2, operation 202). The event location module 102 may identify the filter 106 in any of a variety of ways. For example, referring to FIG. 3, a dataflow diagram is shown of a system 300 for identifying the filter according to one embodiment of the present invention.

A filter generator 350 may generate the filter 106 associated with the user 104 based on input received from any one or more of the following sources. In the following list, any data described as being received from or associated with the user 104 should be understood also to include data received from or associated with other users who are connected to the user 104 in an online social network:

Manual user input. The user 104 may provide manual filter input 302 to define one or more filter criteria. The input 302 may, for example, specify any one or more of the following: event name, event date(s), event location(s), and event category or categories.

Social networking input. The filter generator 350 may receive social networking filter input 306 from one or more social networking profiles 304 associated with the user 104. Examples of social networking applications from which the social networking filter input 306 may be received are Facebook, Myspace, Twitter, Pinterest, and LinkedIn. The filter generator 350 may, for example, receive the social networking filter input 306 using an Application Program Interface (API) provided by the corresponding social networking application. The social networking filter input 306 may include any one or more of the following:

Groups: the groups to which the user 104 belongs.

Activities: the activities in the social networking profile 304 of the user 104.

Movies: the movies in the social networking profile 304 of the user 104.

Interests: the interests in the social networking profile 304 of the user 104.

Religion: the user's religion, as specified in the user's social networking profile 304.

Politics: the user's political affiliation(s), as specified by the user's social networking profile 304.

Notes: the user's notes, as contained in the user's social networking profile 304.

Education: the user's educational history, as specified by the user's social networking profile.

Likes: all of the content (e.g., pages) that the user 104 has liked, as specified by the user's social networking profile 304.

Television: the television shows listed in the user's social networking profile 304.

Events: the events that the user 104 has attended and/or will be attending, as specified by the user's social networking profile 304.

Bio: the biography of the user 104, as specified by the user's social networking profile.

Books: the books liked by the user 104, as specified by the user's social networking profile 304.

Search engine input. The filter generator 350 may receive search engine filter input 310 from one or more search engines 308. The search engine filter input 310 may represent any one or more of the following: the content of queries input by the user 104 into one or more search engines, the results of performing searches based on such queries, and the identity of the search results selected by the user 104.

E-commerce input. The filter generator 350 may receive e-commerce filter input 314 from one or more e-commerce applications 312 (e.g., Amazon, eBay). The e-commerce filter input may represent any one or more of the following: purchases of products or services made by the user 104, listings viewed by the user 104, ratings provided by the user 104, and reviews provided by the user 104.

Check-in input. The filter generator 350 may receive check-in filter input 318 from one or more check-in histories 316 associated with the user 104. For example, as described in more detail below, the system 100 of FIG. 1 may enable the user 104 to be automatically checked in to events. The system 100 may store a history of events at which the user 104 has been checked in within the user's check-in history 316. Such history 316 may include data representing either or both of: (1) events at which the user 104 checked in and subsequently checked out, such that the user 104 no longer is checked in to such events; and (2) events at which the user checked in and at which the user still is checked in (i.e., from which the user has not yet checked out). The record of each event in the history 316 may include one or more timestamps, such as any one or more of the following: (1) a start time of the event; (2) an end time of the event; (3) the time at which the user 104 checked in to the event; and (4) the time at which the user 104 checked out of the event. The record of each event in the history 316 may, for example, include an explicit indication of whether the user 104 currently is checked in to the event; alternatively, the user's current check-in status in connection with the event may be derived from other data (such as the event's start and end times and the user's check-in and/or check-out times). The history 316 may be provided as input 318 to the filter generator 350 for use in generating the filter 106. The check-in filter input 318 may, however, include input received from sources of check-in history other than the system 100 of FIG. 1.

Media input. The filter generator 350 may receive media input 322 from one or more sources of media 320 associated with the user 104. Media 320 may, for example, include music, video, books, or other media stored on any of the user's computers, media players (e.g., iPods), or social networking accounts. The media input 322 may include any data and/or metadata contained within and/or derived from the media 320, such as titles, genres, artists, categories, ratings, reviews, comments, or media content.

The filter 106 may include one or more criteria as a result of the process described above. For example, the filter 106 may include one criterion derived from the manual filter input 302 and another criterion derived from the social networking filter input 306. As another example, the filter 106 may include multiple criteria derived from the social networking filter input 306, e.g., from social networking accounts of the user 104 on multiple online social networking applications.

Although filter criteria are described above as being received from particular sources, any particular filter criterion may be received from any source. For example, media preferences may be received via manual user input instead of from the user's media player. As another example, any criteria within the filter 106 may be given default values by the system 100, where such default values may be overridden by the user 104 and/or by any other source of filter criteria.

The filter 106 may include criteria other than the particular examples listed above. For example, the filter 106 may include criteria defining a minimum and/or maximum number of attendees (e.g., checked-in users) for a particular event or for all events. Such a feature allows the user 104 to specify, e.g., that he or she only wants to be notified about events attended by at least the specified minimum number of people and/or events attended by no more than the specified maximum number of people.

The filter 106 may include criteria that are derived from the particular examples above. The filter generator 350 may generate such derived criteria based any one or more of the particular examples above in any of a variety of ways. Once the filter generator 350 generates such derived criteria, the filter generator 350 may store such derived criteria in the filter 106.

As one example of a derived criterion, consider a case in which the filter generator 350 determines that the user 104 prefers a particular actor, such as Tom Cruise (e.g., as the result of the manual filter input 302 and/or the social networking filter input 306 indicating that the user 104 prefers the actor). In this example, the data within the filter 106 that specifies the particular actor (such as data representing the actor's name) is referred to herein as data representing an "original criterion." The filter generator 350 may conclude, based on a determination that the user prefers the particular actor, that the user 104 prefers media (e.g., movies and television shows) in which the actor appears. As a result, the filter generator 350 may store, in the user filter 106, data representing such media. Such data may, for example, represent such media using characteristics of the media which do not specify the name of the actor, such as the title of the media (e.g., "Mission Impossible") or genre (or other category) of the media (e.g., "Action Movie"). Such a characteristic is an example of a "derived criterion," because it is derived by the filter generator 350 from the original criterion (e.g., the actor's name, "Tom Cruise"). As this example illustrates, an original criterion may represent a specific instance of a general class represented by the derived criterion, and the process of deriving the derived criterion from the original criterion may involve extrapolating from the instance (e.g., "Tom Cruise") to the class (e.g., "Action Movie").

The filter generator 350 may identify such media characteristics by, for example, looking up the actor in a database (such as by performing a query on the database using the name or other characteristic of the actor), identifying records related to the actor in the database (such as records representing movies, television shows, or other media in which the actor appears), and then deriving characteristics from the related records (such as the name and/or genre of the identified media), where such characteristics may include data that is not contained within the database records that represent the actor in the database. Such a process may be repeated additional times to produce further derived characteristics. The same process may be applied not only to actors and movies, but more generally to derive, from data in the inputs 302, 306, 310, 314, 318, 322, data representing one or more derived criteria, and then to store the data representing the one or more derived criteria in the filter 106.

As another example, if the filter generator 350 determines that the user 104 prefers a particular movie or other content (e.g., as the result of determining that any one or more of the inputs 302, 306, 310, 314, 318, or 322, individually or in combination, indicate that the user 104 prefers the movie, such as by specifying the name or other characteristic of the movie), the filter generator 350 may identify a characteristic of the movie (such as its genre), and conclude, based on such a determination, that the user 104 prefers media (e.g., movies and television shows) having the identified characteristic (e.g., genre). As a result, the filter generator 350 may store, in the user filter 106, data representing the identified characteristic (e.g., genre). The identified characteristic is an example of a "derived criterion." The data in the filter 106 that represents the identified characteristic may, for example, represent the identified characteristic using data that is not contained in the input (e.g., inputs 302, 306, 310, 314, 318, or 322) from which the identified characteristic is derived. For example, if the social networking filter input 306 indicates that the user 104 likes the movie "Mission Impossible," the filter generator 350 may determine, using a database external to the system 300, that "Mission Impossible" is in the "action" genre. The filter generator 350 may then store data representing the "action" genre in the filter 106. Embodiments of the present invention (as described below) may then use the filter 106 to identify and notify the user 104 of movies in the "action" genre that are near the user 104's current location, even though the user 104 did not provide any input explicitly indicating that the user 104 likes movies in the "action" genre. Instead, using the techniques described above, the filter generator 350 is able to infer that the user 104 likes movies in the "action" genre from the fact that the user 104 (as indicated by one or more of the inputs 302, 306, 310, 314, 318, and 322) likes specific instances of movies in the "action" genre. The same process may be applied not only to movies and genres, but more generally to derive, from data in the inputs 302, 306, 310, 314, 318, 322, data representing one or more derived criteria, and then to store the data representing the one or more derived criteria in the filter 106.

The criteria in the filter 106 may be combined within the filter 106 in any of a variety of ways. For example, the criteria in the filter 106 may be combined using any combination of Boolean operators (e.g., AND, OR, XOR, and NOT). The event location module 102 may then apply the filter 106 using the Boolean operators in the filter 106.

As another example, a weight may be associated with each of the criteria in the filter 106, such that all of the weights in the filter 106 sum to 1 or 100% or another equivalent value. For example, if the filter 106 contains two criteria, then one of the criteria may have a weight of 30% and the other criterion may have a weight of 70%. The event location module 102 may then apply the filter 106 using the weights associated with each of the criteria in the filter 106.

Returning to FIGS. 1 and 2, the event location module 102 identifies the location 108 associated with the user 104 (FIG. 2, operation 204). The event location module 102 may identify the location 108 automatically using, for example, a Global Positioning System (GPS) or other automatic location-identifying system. For example, the user's check-in history 316 may be used to identify the location 108, such as by concluding that the user's location 108 is the location of a particular event if the check-in history 316 indicates that the user 104 currently is checked-in to the event. More generally, the event location module 102 may identify the location 108 independently of any location-specifying input provided by the user 104. The event location module 102 may, however, alternatively identify the location 108 based on manual input received from the user 104, such as input from the user 104 specifying the user's current (or future) zip code, street address, or event identifier (e.g., event name).

The event location module 102 identifies the radius 116 associated with the user 104 (FIG. 2 operation 206). The event location module 102 may identify the radius 116 in any of a variety of ways. For example, the user 104 may have previously provided input specifying the radius 116 using any kind of input device, such as a keyboard, mouse, touchscreen, or voice input. In response to receiving such radius-specifying input, the event location module 102 may store the value specified by the user as the radius 116, and then use the stored radius 116 for one or more subsequent searches performed by the event location module 102 in connection with the user, unless and until the radius 116 changes (e.g., in response to subsequent input from the user 104 changing the radius 116 to a different value). The radius 116 may be specified and/or represented in any units, such as feet, yards, meters, kilometers, or miles.

As will be described in detail below, the radius 116 may be used to define the radius of a circle that is centered on the user's location 108, such that the event location module 102 only includes, within the event result set 114, events that satisfy the user filter 106 and that are within the circle defined by the radius 116 and the user's location 108. In other words, the event location module 102 may not include events in the event result set 114 if such events fall outside of the circle defined by the radius 116 and the user's location 108, even if such events satisfy the user's filter 106.

The radius 116 need not, however, define a circle. More generally, the radius 116 may include any one or more data values that define any shape containing the user's location 108 (whether or not the user's location 108 is at the center of such a shape). For example, if the event result set 114 is to be displayed on a map (such as a map displayed by a GPS unit or a map displayed by a map web site), then the radius 116 may define the size and shape of such a map. For example, the event location module 102 may use, as the user radius 116, the size and shape of the map or other display that is displayed by the GPS unit, map web site, or map application on which the event result set 114 is to be rendered. The radius 116 may, therefore, define a square or a rectangle, for example. As these examples illustrate, the radius 116 may be defined automatically (i.e., without receiving input from the user 104 that specifies the radius 116), such as by defining the radius 116 based on data received automatically from a GPS unit or map web site representing the size and/or shape of the display area on which the event result set 114 is to be rendered.

The event location module 102 optionally identifies the time 118 associated with the user 104 (FIG. 2 operation 208). The event location module 102 may identify the time 118 in any of a variety of ways. For example, the event location module 102 may identify the time 118 automatically, such as by reading the current time from a clock. As another example, the event location module 102 may identify the time 118 based on input provided manually by the user 104. For example, if the user 104 wishes to search for events occurring at a time other than the current time, the user 104 may provide input specifying the time(s) to be searched. Such times may, for example, take the form of a single time or a range of times (such as a range of times independent of any particular date (e.g., 9 am-5 pm), a range of dates, or a range specified by a start time on a start date and an end time on an end date (where the start date and the end date may or may not differ from each other). In any of these cases, the event location module 102 may store data representing the time(s) input by the user 104 as the time 118 and then use the stored time 118 for one or more searches performed by the event location module 102 in connection with the user 104.

The event location module 102 may also identify the event database 112 (FIG. 2, operation 210). The event database 112 may be any set of data representing one or more events. The event database 112 may, for example, be an event database 112 provided by a third-party service, such as Eventful, in which case the event location module 102 may receive data from the event database 112 through an API provided by such a service. Additionally or alternatively, the system 100 of FIG. 1 may maintain its own event database. Furthermore, the event database 112 shown in FIG. 1 may in practice be, or be derived from, a plurality of databases.

Figure 4:
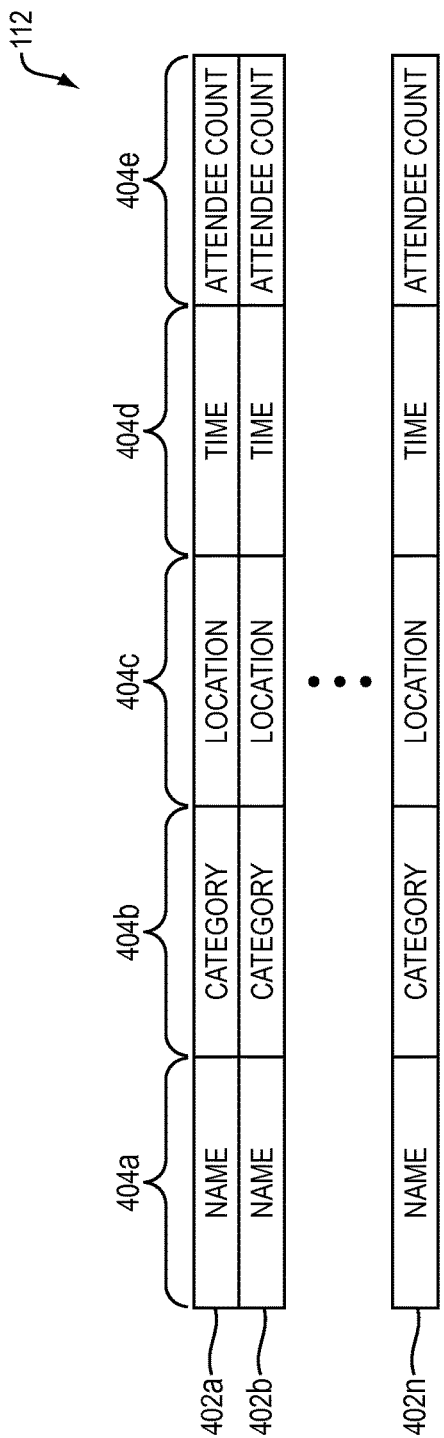
FIG. 4 is a diagram representing the structure of structure of an event database record according to one embodiment of the present invention.

The event database 112 may have any format. In fact, the event database 112 need not be stored in the form of a database, but more generally may be stored in any one or more data structures. An example of the format of records in the event database 112 is shown in FIG. 4. This format is merely an example and does not constitute a limitation of the present invention.

In the example of FIG. 4, the event database 112 includes a table containing a plurality of records 402*a-n*, each of which represents a distinct event. The table has five columns (fields) representing the following data for each event: name 404*a*, category 404*b*, location 404*c*, time 404*d*, and attendee count 404*e*. For example, the name field 404*a* of row (record) 402*a* contains the name of the event represented by row 402*a*; the category field 404*b* of row 402*a* contains one or more categories of the event represented by row 402*a*; the location field 404*c* of row 402*a* contains one or more locations of the event represented by row 402*a*; the time field 404*d* of row 402*a* contains one or more times of the event represented by row 402*a*, and the attendee count field 404*e* contains the current number of attendees (e.g., checked-in users) at the event represented by row 402*a*. The remaining rows 402*b-n* contain data that is structured similarly to row 402*a*.

Locations stored in the location column 404*c* may be represented in any of a variety of ways, such as by street addresses, latitude and longitude, location name, or any combination thereof. Times stored in the time column 404*d* may be represented in any of a variety of ways, such as by a date (e.g., Jan. 23, 2012), a combination of a date and a time (e.g., Jan. 23, 2012 at 10:30:00), a combination of a date and a range of times (e.g., Jan. 23, 2012 from 10:30:00 to 11:30:00), or a repeating set of times defined in any way (e.g., every Thursday from 11:00 am to 11:30 am or all day on the second Thursday of every month).

An "event" may be any occurrence that can be represented within the event database 112. Examples of events include, but are not limited to: temporary events (such as concerts, movie showings, and exhibitions); sales events (such as a clothing sale event occurring at a particular store or brand of stores at a particular location or locations and within a particular time window or windows); and itineraries (e.g., jogging routes or commuting paths).

Returning to FIGS. 1 and 2, once the event location module 102 has identified the filter 106, the location 108, (optionally) the radius 116, and (optionally) the time 118, the event location module 102 may treat this combination of data may as a query. The event location module 102 may therefore perform a search of the event database 112 for event records that match the query represented by the combination of the user filter 106, the user location 108, and (optionally) one or both of the radius 116 and the time 118 (FIG. 2, operation 212). In other words, the event location module 102 searches the event database 112 for events that satisfy the filter 106, that occur within the radius 116 of the location 108, and that occur at or within the time 118. The result of operation 212 is the event result set 114, which contains zero or more records resulting from the search performed in operation 212.

Once the event result set 114 has been generated, it may be manifested to the user 104 in any of a variety of ways. "Manifesting" data refers herein to producing any kind of output based on the data, such as visual and/or auditory output. For example, manifesting data may include displaying text and/or images based on the data, or producing sound (e.g., recorded and/or simulated speech) based on the data.

Figure 5:
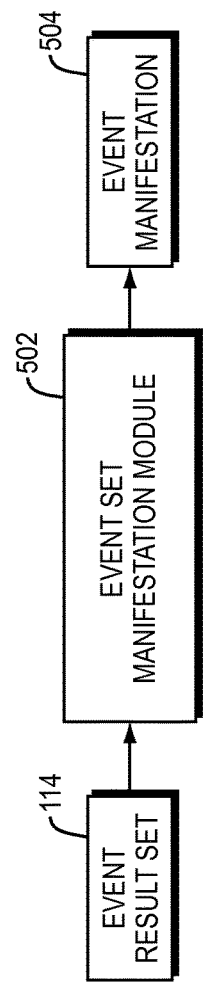
FIG. 5 is a dataflow diagram of a system for manifesting the event result set of FIG. 1 according to one embodiment of the present invention.

Referring to FIG. 5, a dataflow diagram is shown of a system 500 for manifesting the event result set 114 according to one embodiment of the present invention. The system 500 of FIG. 5 includes an event set manifestation module 502, which manifests the event result set 114 to produce an event manifestation 504 (FIG. 2, operation 214). The event manifestation 504 may, for example, include a textual list of events in the event result set 114, in which each item in the list contains information about the corresponding event, such as its name, category, location, and time. The event set manifestation module 502 may, for example, add one or more of the events in the event result set 114 to one or more calendars of the user 104 (e.g., the Outlook calendar, iCal calendar, or Google Calendar of the user 104).

As another example, the event manifestation 504 may include a map containing icons representing the events in the event result set 114. The map may represent a geographic area containing (e.g., centered on) the user's location 108. The icons representing the events in the event result set 114 may be located at positions on the map corresponding to the locations of the events in the event result set 114. The icons in the map may represent events in any of a variety of ways. For example, distinct event types may be represented by distinct icons. For example, movies may be represented by a first unique icon, concerts may be represented by a second unique icon, and plays may be represented by a third unique icon. As another example, distinct genres may be represented by distinct icons. For example, action movies may be represented by a first unique icon, comedy movies may be represented by a second unique icon, and romance movies may be represented by a third unique icon.

The map may contain icons representing events that are not in the event result set 114. For example, the map may contain icons representing events in the event database 112 that did not satisfy the query performed by the event location module 102 to produce the event result set 114. The icons that are used to represent such "non-matching" events in the event manifestation may differ from the icons that are used to represent events in the event result set 114 in the event manifestation 504. For example, icons representing events in the event result set 114 may have a special color, size, style, or other feature that visually distinguishes them from icons representing non-matching events. For example, matching events may be displayed using icons having a first visual characteristic (e.g., a first color), while non-matching events may be displayed using icons having a second visual characteristic (e.g., a second color) that differs from the first visual characteristic.

The manifestation 504 may be provided to the user 104 in any of a variety of ways. For example, the manifestation 504 may be displayed on a screen to the user 104 or output through speakers to the user 104. As another example, the manifestation 504 may be transmitted to the user 104 using any messaging mechanism, such as email, text message, voice call, or social networking message.

As shown in FIG. 2, the method 200 of FIG. 2 may repeat automatically. For example, the method 200 may be configured to repeat periodically according to a fixed period (e.g., every second, every minute, or every hour) or in response to a change in context (e.g., in response to a change in the user's location 108).

The method 200 need not repeat all operations of the method 200. For example, the method 200 may only identify the filter 106 (operation 202), the radius 116 (operation 206), and the event database 210 (operation 210) once, and then repeat only operations 204 (identifying the user's current location 108), 208 (identifying the current time), 212 (searching the event database 112), and 214 (manifesting the event result set) when repeating the method 200.

In particular, the method 200 may repeat to automatically identify any change in the current time, and to identify any change in the user's current location 108. The event location module 102 may then search the event database 112 again based on the new time 118 and/or location 108, thereby generating a new event result set (not shown) that may differ from the previously-generated event result set 114. The new event result set may, for example, include events not included in the original event result set 114 and/or not include events that were included in the original event result set 114. By manifesting the new event result set to the user 104 automatically, the method 200 may continuously keep the user 104 updated about any events of interest to the user 104 within the user's vicinity even while the user's location change and even as time progresses, without requiring further input from the user 104.

Embodiments of the present invention may provide such updates in real time or substantially in real time. For example, the event location module 102 may respond immediately to changes in any one or more of the user filter 106, user location 108, user radius 116, user time 118, and event database 112 to perform an updated search of the event database 112 (operation 212 of FIG. 2) and thereby provide the user 104 with an updated event result set 114 as quickly as possible. Such real time updates may be particularly useful not only because they provide the user 104 with the experience of receiving continuous updates, but also because such updates need not require the user 104 to provide additional input. For example, if the user's location 108 changes, the event location module 102 may detect such a change without requiring input from the user 104, such as by detecting the user's new location 108 based on input from a GPS module. The event location module 102 may then perform a new search of the event database 112 based on the user's new location 108 and provide the user 104 with an updated event result set 114 even though the user has not provided any additional input. This feature of embodiments of the present invention enables the system 100 to provide the user 104 with updated, accurate, and timely notifications of events of interest to the user 104 with minimal input from the user 104. As a result, the user 104 is more likely to receive such updates because the user 104 does not need to repeatedly provide manual input to learn about current events of interest to the user 104.

As another example, a path containing multiple locations may be provided as input to the event location module 102, in response to which the event location module 102 may perform the method 200 (or relevant parts of the method) once for each location in the path, treating each location in the path as the user location 108. Such a path may, for example, represent a planned travel itinerary of the user 104 (e.g., from one city to another or within a single city), rather than a path that the user 104 has actually traveled. Input representing the path may, for example, be provided by the user 104 manually, or be obtained automatically from a source such as a travel application (e.g., Expedia or TripIt). The output of repeating method 200 in this way may be, for each of the locations in the path, an event result set corresponding to that location. The event location module 102 may, for example, use the same or different filter 106 for each location in the path, the same or different radius 116 for each location in the path, the same or different time 118 for each location in the path, and the same or different event database 112 for each location in the path.

In the example above, the path may be provided to the event location module 102 as, for example, a set of discrete locations or a continuous path. In the former case, the event location module may, for example, calculate a continuous path linking the specified discrete set of locations, then identify additional discrete locations along the calculated continuous path, and then perform the method 200 of FIG. 2 for all discrete locations (i.e., both the originally-specified discrete locations and the automatically identified discrete locations). If the path is provided to the event location module 102 as a continuous path, then the event location module 102 may, for example, identify two or more discrete locations along the specified continuous path and then perform the method 200 of FIG. 2 on each such identified discrete location.

When searching for events within a particular radius 116 of a path rather than a point, the event location module 102 may, for example, search within the radius 116 of each of a plurality of locations in the path. As another example, the event location module 102 may search within an area that contains the path and points within the radius 116 of all points on the path.

Embodiments of the present invention may also be used to automatically check the user 104 in to events. "Checking in" the user 104 to an event refers to storing a record indicating that the user 104 currently is attending the event. Such a record may, for example, be stored in one or more of the user's social networking profiles 304, in a database maintained by the organizer of the event, or in a separate record (not shown) maintained by the system 100 of FIG. 1. Checking the user 104 in to an event may, for example, include adding the event to one or more of the user's calendars.

Checking the user 104 into an event may open one or more channels of communication between the event organizer and the user 104. For example, the event organizer may send event-related announcements via any media (e.g., any one or more of email, voice call, and text message) to checked-in users before, during, and/or after the event. As another example, checked-in users may be provided with the ability to send messages to entities related to the event, such as the event organizer, other checked-in users, or event sponsors/partners. As yet another example, checked-in users may be provided with the ability to provide ratings and/or reviews of the event, sub-events (e.g., presentations giving during the event), products/services marketed at the event, and/or event sponsors/partners. Such ratings/reviews may be made available automatically to all checked-in users via messages send via any media.

Any of the following data related to an event may be searchable by including criteria related to such data within the user's filter 106:

attendee count and other information about attendees;

media count (e.g., number of pictures associated with an event) and other information about event-related media;

ratings and information derived from ratings (e.g., average, minimum, and maximum ratings); and comment count (e.g., number of comments associated with an event) and other information about comments associated with the event.

As a result, the user 104 may cause the event location module 102 to search for events having particular associated data. For example, the user 104 may specify, in the filter 106, that the user 104 is only interested in events that:

currently are being attended by at least some user-specified minimum number of attendees, or currently are being attended by no more than some user-specified maximum number of attendees;

have at least some user-specified minimum number of photographs posted by other users;

have an average rating (based on ratings provided by other users) that satisfies some criteria (e.g., an average rating of at least three out of five stars); or have at least some user-specified minimum number of comments posted by other users.

Figure 6A:
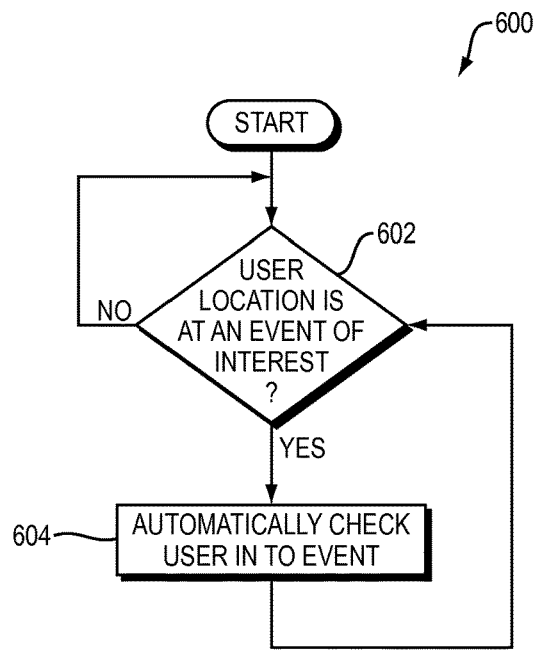
FIGS. 6A-6B are flowcharts of methods for checking a user into and out of an event according to one embodiment of the present invention.

Referring to FIG. 6A, a flowchart is shown of a method 600 that is used to automatically check in the user 104 to an event of interest according to one embodiment of the present invention. The method 600 determines whether the user 104 currently is located at or near an event in the event result set 114 (operation 602). The method 600 may make this determination by, for example, comparing the user's current location 108 to the locations (column 404c in FIG. 4) of events in the event result set 114. If the user's location is within, the same as, or within some predetermined specified distance (e.g., ten feet, one hundred feet, or one hundred yards) of the location of an event in the event result set 114, then the method 600 may conclude that the user 104 currently is at that event. In response to determining that the user 104 currently is at an event in the event result set 114, the method 600 may automatically check in the user 104 to the event (operation 604). The method 600 may repeat so that the user 104 may be automatically checked in to other events as the user's location 108 changes and as new events occur.

Furthermore, embodiments of the present invention may prohibit the user 104 from checking in to an event if the user 104 is not near the event. For example, if the user 104 attempts to check in to a particular event, embodiments of the present invention may compare the user's current location 108 to the location of the particular event. If the user's current location 108 is not within some predetermined specified distance of the event's location, then embodiments of the present invention may reject the user's attempt to check in to the event.

Figure 6B:
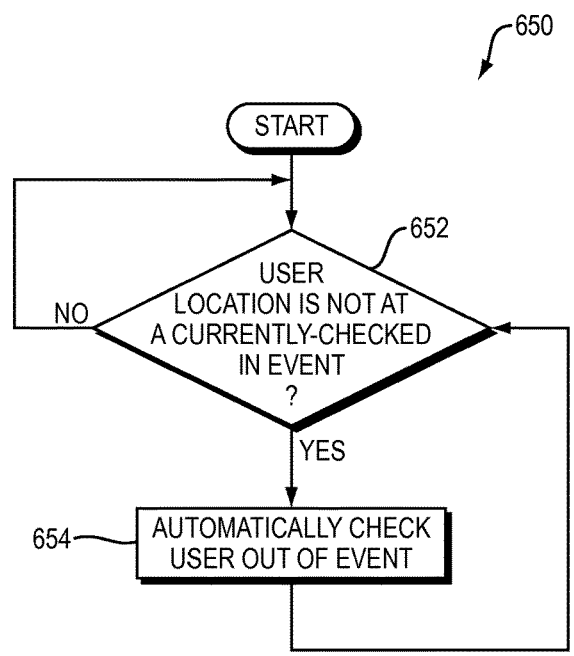

Referring to FIG. 6B, a flowchart is shown of a method 650 that is used to automatically check the user 104 out of events of interest according to one embodiment of the present invention. The method 650 determines whether the user 104 currently is not located at or near an event to which the user 104 currently is checked in (operation 652). The method 650 may make this determination in a manner similar to the determination of operation 602 in FIG. 6A, except that the scope of operation 652 is limited to the event(s) to which the user 104 currently is checked in. In response to determining that the user 104 currently is not at an event to which the user 104 currently is checked in, the method 650 may automatically check the user 104 out of the event (operation 654). The operation 654 may repeat so that the user 104 may be automatically checked out of other events as the user's location 108 changes and as current events terminate. As this implies, the user 104 may be checked out of an event because, for example, the user 104 moves away from the event, the event moves away from the user 104 (e.g., in the case of a sale event in a moving truck), or the event terminates (even if the location of the user 104 and the location of the event do not change).

Embodiments of the present invention have a variety of advantages. In general, embodiments of the present invention enable users to find events of interest easily and with minimum effort. For example, by automatically scanning the event database 112 continuously for events that match the user's interests and notifying the user 104 of any matching events, the user 104 may learn of events of interest without needing to manually and repeatedly search for such events.

Similarly, because embodiments of the present invention are responsive to movement of the user 104, such embodiments may automatically notify the user 104 of events that come within the radius 116 of the user 104 as the user's location changes, without the need for the user 104 to manually search for such events. As yet another example, because embodiments of the present invention are responsive to the commencement of events at particular times, such embodiments may automatically notify the user 104 of events as they commence, without the need for the user 104 to manually search for such events.

A related advantage of embodiments of the present invention is that they may generate the filter 106 based on a wide variety of data, including data drawn from the user's social networking profiles 304, search engine filter input 310, e-commerce filter input 314, and check-in history 316. As a result, embodiments of the present invention may learn about the user 104 automatically based on such data and develop a filter that accurately reflects the user's preferences with a minimum of effort on the part of the user.

Yet another advantage of embodiments of the present invention is that they may be used to automatically check users in to events and automatically check users out of events as the users arrive at events and leave events, and as events commence and terminate. This eliminates the need for the user to remember to manually check in and check out of events, thereby resulting in a record of the user's check-in status (such as on the user's social networking profiles) that is more accurate and timely than if the user 104 were required to update such a status manually. Furthermore, if being checked in to an event provides the user 104 with a benefit, such as eligibility for a raffle or other prize, then automatic check-in increases the likelihood that the user 104 will receive the benefit. Conversely, if being checked in to an event after the user 104 has left the event (or after the event has terminated) is to the detriment of the user, such as in cases in which the user 104 pays for attendance at the event based on the amount of time the users spends at the event, then automatic check-out decreases the likelihood that the user will incur the detriment.

One example of a benefit that the user 104 may receive as a result of being checked-in to an event is that embodiments of the present invention may enable the user 104 to receive and/or send communications related to the event only in response to the user checking in to the event. Furthermore, embodiments of the present invention may enable the user 104 to receive and/or send such communications only for as long as the user 104 remains checked-in to the event. For example, in response to determining that the user is checked-in to an event (such as by automatically checking the user in to the event using the method 600 of FIG. 6A), embodiments of the present invention may send, to the user 104, notifications about special offers for products and/or services that are only available to users who have checked in to the event (i.e., attendees of the event). Embodiments of the present invention may send such notifications in any of a variety of ways, such as by email, text message, voice call, or message transmitted via an online social networking system (such as Facebook or Twitter). In response to determining that the user 104 is no longer checked-in to the event, embodiments of the present invention may stop sending notifications about such special offers to the user 104. Furthermore, if the user 104 receives such a notification while the user 104 is checked-in to an event but then checks out of the event and then attempts to accept the special offer described in the notification (such as by providing input to an embodiment of the present invention indicating an attempt by the user 104 to accept the offer), embodiments of the present invention may prevent the user 104 from receiving the benefit of the special offer (e.g., purchasing the advertised product/service for a discounted price). In other words, embodiments of the present invention may both send notifications of special offers related to an event to the user 104 only while the user 104 is checked-in to the event and only permit the user 104 to accept such special offers while the user 104 is checked-in to the event.

Embodiments of the present invention need not send all offers associated with a particular event to the user 104 after the user 104 has checked in to the event. Embodiments of the present invention may, for example, in response to determining that the user 104 has checked in to a particular event:

(1) identify all special offers for products and/or services that are only available to users who have checked in to the event;

(2) filter the set of special offers identified in (1) using the user's filter 106 to identify a subset of the special offers that satisfy the filter 106; and (3) notify the user 104 about only the subset of special offers that satisfy the filter 106.

For example, if the user 104 is attending a concert at which there are many special offers for different kinds of food but the user's filter 106 indicates that the user 104 is a vegetarian, then the user 104 may be notified only of special offers for vegetarian food and not for food containing meat. In this way, embodiments of the present invention may notify the user 104 only of special offers that are relevant to the user 104, as defined by the user's filter 106.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s). Any information not explicitly described herein as being represented and stored in such data structure(s) may be represented in such data structure(s). For example, any of the following may be stored in such data structures: the user filter 106 (which is an example of filter data), the user location 108 (which is an example of location data), the user radius 116 (which is an example of radius data), the user time 118 (which is an example of user time data), the event result set 114 (which is an example of event result set data), the manual filter input 302 (which is an example of filter input data), the social networking filter input 306 (which is an example of social networking filter input data), the search engine filter input 310 (which is an example of search engine filter input data), the e-commerce filter input 314 (which is an example of e-commerce filter input data), the check-in filter input 318 (which is an example of check-in filter input data), and the media input 322 (which is an example of media input data).

What is claimed is:

1. A method performed by at least one computer processor executing computer program instructions stored on at least one non-transitory computer-readable medium, the method comprising:
  (A) generating filter data associated with a user, comprising:
    (A) (1) automatically obtaining, from a social networking application via an Application Program Interface, first criterion data from a social networking profile associated with the user, wherein the first criterion data represents a first criterion, wherein the first criterion comprises one of a group to which the user belongs, an activity in the social networking profile associated with the user, a movie in the social networking profile of the user, an interest in the social networking profile of the user, content that the social networking profile of the user specifies that the user has liked, a television show listed in the social networking profile of the user, and an event that the social networking profile of the user indicates that the user has attended or will be attending; and
    (A) (2) receiving check-in history data, wherein the check-in history data contains second criterion data representing a second criterion that differs from the first criterion, wherein the second criterion specifies an event to which the user has checked in;
  (B) identifying first location data representing a first location associated with the user;
  (C) identifying first event data representing a first plurality of events;
  (D) automatically identifying a first time associated with the user; and
  (E) generating first event result set data, based on the filter data, the first location data, the first criterion data, and the first plurality of events, wherein the first event result set data representing a first event result set, wherein the first event result set includes at least one first event in the first plurality of events that satisfies the first criterion and that is near the first location associated with the user, comprising:
    for each particular event within the first plurality of events:
      (E) (1) determining whether the particular event is associated with the first time associated with the user, comprising determining whether the first time associated with the user is between a start time and an end time of the particular event;
      (E) (2) including the particular event within the first event result set only if the particular event is determined to be associated with the first time associated with the user;
    for each particular event within the first event result set:
      (E) (3) determining whether the check-in history data indicates that the user currently is checked in to the particular event; and
      (E) (4) including the particular event within the first event result set only if the check-in history data indicates that the user currently is checked in to the particular event;
  wherein the at least one first event comprises a plurality of result events, and wherein the method further comprises:

(F) manifesting the first event result set data to the user, thereby producing a first event result set manifestation, wherein the first event result set manifestation comprises a map representing a geographic area containing the first location associated with the user, wherein the map comprises a plurality of icons representing the plurality of result events;

(G) automatically determining whether the first location is within a predetermined specified distance of a location of a particular event in the first event result set; and (H) automatically checking the user in to the particular event in response to determining that the first location is within the predetermined specified distance of the location of the particular event;

wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

2. The method of claim 1, wherein (B) comprises identifying the location data independently of any location-specifying input provided by the user.

3. The method of claim 2, wherein (B) comprises identifying the location data using a Global Positioning System (GPS) module.

4. The method of claim 1, further comprising:
(I) identifying second location data representing a second location associated with the user, wherein the second location differs from the first location; and
(J) generating second event result set data, based on the filter data, the second location data, and the first plurality of events, wherein the second event result set data represents a second event result set, wherein the second event result set includes at least one second event in the first plurality of events that satisfies the first criterion and that is near the second location associated with the user.

5. The method of claim 1, further comprising:
(I) identifying second location data representing a second location associated with the user, wherein the second location differs from the first location;
(J) identifying second event data representing a second plurality of events; and
(K) generating second event result set data, based on the filter data, the second location data, and the second plurality of events, wherein the second event result set data represents a second event result set, wherein the second event result set includes at least one second event in the second plurality of events that satisfies the first criterion and that is near the second location associated with the user.

6. The method of claim 1, wherein (A) further comprises:
(A) (3) receiving manual input from the user, wherein the manual user input contains second criterion data representing a second criterion that differs from the first criterion; and
wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

7. The method of claim 1, wherein (A) further comprises:
(A) (3) receiving input from a search engine, wherein the input from the search engine contains second criterion data representing a second criterion that differs from the first criterion; and
wherein (D) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

8. The method of claim 7, wherein the input from the search engine represents content of a query input by the user into the search engine.

9. The method of claim 7, wherein the input from the search engine represents results of a query executed by the search engine.

10. The method of claim 1, wherein (A) further comprises:
(A) (3) receiving input from an e-commerce application, wherein the input from the e-commerce application contains second criterion data representing a second criterion that differs from the first criterion; and
wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

11. The method of claim 10, wherein the input from the e-commerce application represents a product purchased by the user.

12. The method of claim 1, wherein (E) further comprises, for each particular event within the first plurality of events:
(E) (5) identifying a feature of the particular event;
(E) (6) determining whether the feature identified in (E) (1) satisfies a predetermined criterion; and
(E) (7) including the particular event within the first event result set only if the feature identified in (E) (1) satisfies the predetermined criterion.

13. The method of claim 12, wherein the feature comprises a number of people currently checked in to the particular event, and wherein (E) (6) comprises determining whether the number of people currently checked in to the particular event is at least as great as a predetermined minimum number.

14. The method of claim 12, wherein the feature comprises a number of people currently checked in to the particular event, and wherein (E) (6) comprises determining whether the number of people currently checked in to the particular event is no greater than a predetermined maximum number.

15. The method of claim 12, wherein the feature comprises a number of pictures associated with the particular event, and wherein (E) (6) comprises determining whether the number of pictures associated with the event is at least as great as a predetermined minimum number.

16. The method of claim 1, wherein (A) further comprises:
(A) (3) receiving media input representing a medium associated with the user, wherein the media input contains second criterion data representing a second criterion that differs from the first criterion; and wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

17. The method of claim 16, wherein the second criterion comprises a title of the medium.

18. The method of claim 16, wherein the second criterion comprises a genre of the medium.

19. The method of claim 1, wherein (E) further comprises, for each particular event within the first plurality of events:
 (E) (5) determining whether the particular event is within a shape containing the first location associated with the user; and
 (E) (6) including the particular event within the first event result set only if the particular event is determined to be within the shape containing the first location associated with the user.

20. The method of claim 19:
 wherein (E) (5) comprises determining whether the particular event is within a predetermined radius of the first location associated with the user; and
 wherein (E) (6) comprises including the particular event within the first event result set only if the particular event is determined to be within the predetermined radius of the first location associated with the user.

21. The method of claim 1, wherein (D) comprises identifying a first current time as the first time associated with the user.

22. The method of claim 21, further comprising:
 (I) identifying a second time associated with the user; and
 (J) generating second event result set data, based on the filter data, the first location data, the second time, and the first plurality of events, wherein the second event result set data represents a second event result set, wherein the second event result set includes at least one second event in the first plurality of events that satisfies the first criterion, that is associated with the second time, and that is near the first location associated with the user.

23. The method of claim 1:
 wherein the first location data represents a first location associated with the user at a first time; and
 wherein the method further comprises:
 (I) identifying second location data representing a second location associated with the user at a second time, wherein the second time is later than the first time;
 (J) determining whether the second location is within the predetermined specified distance of the location of the particular event in the first event result set; and
 (K) checking the user out of the particular event in response to determining that the second location is not within the predetermined specified distance of the location of the particular event.

24. The method of claim 1:
 wherein (B) comprises identifying first location data representing a plurality of locations associated with the user, wherein the plurality of locations includes the first location; and
 wherein (E) further comprises, for each particular event within the first plurality of events:
 (E) (5) determining whether the particular event is near any of the plurality of locations; and
 (E) (6) including the particular event within the first event result set only if the particular event is determined to be near any of the plurality of locations.

25. A non-transitory computer-readable medium comprising computer program instructions stored thereon, wherein the computer program instructions are executable by at least one processor to perform a method, the method comprising:
 (A) generating filter data associated with a user, comprising:
 (A) (1) automatically obtaining, from a social networking application via an Application Program Interface, first criterion data from a social networking profile associated with the user, wherein the first criterion data represents a first criterion, wherein the first criterion comprises one of a group to which the user belongs, an activity in the social networking profile associated with the user, a movie in the social networking profile of the user, an interest in the social networking profile of the user, content that the social networking profile of the user specifies that the user has liked, a television show listed in the social networking profile of the user, and an event that the social networking profile of the user indicates that the user has attended or will be attending; and
 (A) (2) receiving check-in history data, wherein the check-in history data contains second criterion data representing a second criterion that differs from the first criterion, wherein the second criterion specifies an event to which the user has checked in;
 (B) identifying first location data representing a first location associated with the user;
 (C) identifying first event data representing a first plurality of events;
 (D) automatically identifying a first time associated with the user; and
 (E) generating first event result set data, based on the filter data, the first location data, the first criterion data, and the first plurality of events, wherein the first event result set data representing a first event result set, wherein the first event result set includes at least one first event in the first plurality of events that satisfies the first criterion and that is near the first location associated with the user, comprising:
 for each particular event within the first plurality of events:
 (E) (1) determining whether the particular event is associated with the first time associated with the user, comprising determining whether the first time associated with the user is between a start time and an end time of the particular event;
 (E) (2) including the particular event within the first event result set only if the particular event is determined to be associated with the first time associated with the user;
 for each particular event within the first event result set:
 (E) (3) determining whether the check-in history data indicates that the user currently is checked in to the particular event; and
 (E) (4) including the particular event within the first event result set only if the check-in history data indicates that the user currently is checked in to the particular event;
 wherein the at least one first event comprises a plurality of result events, and wherein the method further comprises:
 (F) manifesting the first event result set data to the user, thereby producing a first event result set manifestation, wherein the first event result set manifestation comprises a map representing a geographic area containing the first location associated with the user, wherein the map comprises a plurality of icons representing the plurality of result events;
(G) automatically determining whether the first location is within a predetermined specified distance of a location of a particular event in the first event result set; and
(H) automatically checking the user in to the particular event in response to determining that the first location is within the predetermined specified distance of the location of the particular event;
wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

26. The computer-readable medium of claim 25, wherein (B) comprises identifying the location data independently of any location-specifying input provided by the user.

27. The computer-readable medium of claim 26, wherein (B) comprises identifying the location data using a Global Positioning System (GPS) module.

28. The computer-readable medium of claim 25, wherein the method further comprises:
(I) identifying second location data representing a second location associated with the user, wherein the second location differs from the first location; and
(J) generating second event result set data, based on the filter data, the second location data, and the first plurality of events, wherein the second event result set data represents a second event result set, wherein the second event result set includes at least one second event in the first plurality of events that satisfies the first criterion and that is near the second location associated with the user.

29. The computer-readable medium of claim 25, wherein the method further comprises:
(I) identifying second location data representing a second location associated with the user, wherein the second location differs from the first location;
(J) identifying second event data representing a second plurality of events; and
(K) generating second event result set data, based on the filter data, the second location data, and the second plurality of events, wherein the second event result set data represents a second event result set, wherein the second event result set includes at least one second event in the second plurality of events that satisfies the first criterion and that is near the second location associated with the user.

30. The computer-readable medium of claim 25, wherein (A) further comprises:
(A) (3) receiving manual input from the user, wherein the manual user input contains second criterion data representing a second criterion that differs from the first criterion; and
wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

31. The computer-readable medium of claim 25, wherein (A) further comprises:
(A) (3) receiving input from a search engine, wherein the input from the search engine contains second criterion data representing a second criterion that differs from the first criterion; and
wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

32. The computer-readable medium of claim 25, wherein (A) further comprises:
(A) (3) receiving input from an e-commerce application, wherein the input from the e-commerce application contains second criterion data representing a second criterion that differs from the first criterion; and
wherein (D) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

33. The computer-readable medium of claim 25, wherein (E) further comprises, for each particular event within the first plurality of events:
(E) (5) identifying a feature of the particular event;
(E) (6) determining whether the feature identified in (D) (1) satisfies a predetermined criterion; and
(E) (7) including the particular event within the first event result set only if the feature identified in (D) (1) satisfies the predetermined criterion.

34. The computer-readable medium of claim 33, wherein the feature comprises a number of people currently checked in to the particular event, and wherein (E) (6) comprises determining whether the number of people currently checked in to the particular event is at least as great as a predetermined minimum number.

35. The computer-readable medium of claim 33, wherein the feature comprises a number of people currently checked in to the particular event, and wherein (E) (6) comprises determining whether the number of people currently checked in to the particular event is no greater than a predetermined maximum number.

36. The computer-readable medium of claim 33, wherein the feature comprises a number of pictures associated with the particular event, and wherein (E) (6) comprises determining whether the number of pictures associated with the event is at least as great as a predetermined minimum number.

37. The computer-readable medium of claim 25, wherein (A) further comprises:
(A) (3) receiving media input representing a medium associated with the user, wherein the media input contains second criterion data representing a second criterion that differs from the first criterion; and
wherein (E) comprises generating the first event result set data based on the filter data, the first location data, the first criterion data, the second criterion data, and the first plurality of events, wherein the first event result set data represents at least one first event in the first plurality of events that satisfies the first criterion and the second criterion and that is near the first location associated with the user.

38. The computer-readable medium of claim 25, wherein (E) further comprises, for each particular event within the first plurality of events:
- (E) (5) determining whether the particular event is within a shape containing the first location associated with the user; and
- (E) (6) including the particular event within the first event result set only if the particular event is determined to be within the shape containing the first location associated with the user.

39. The computer-readable medium of claim 38:
wherein (E) (5) comprises determining whether the particular event is within a predetermined radius of the first location associated with the user; and
wherein (E) (6) comprises including the particular event within the first event result set only if the particular event is determined to be within the predetermined radius of the first location associated with the user.

40. The computer-readable medium of claim 25, wherein the method further comprises:
- (I) identifying a second time associated with the user; and
- (J) generating second event result set data, based on the filter data, the first location data, the second time, and the first plurality of events, wherein the second event result set data represents a second event result set, wherein the second event result set includes at least one second event in the first plurality of events that satisfies the first criterion, that is associated with the second time, and that is near the first location associated with the user.

41. The computer-readable medium of claim 25:
wherein the first location data represents a first location associated with the user at a first time; and
wherein the method further comprises:
- (I) identifying second location data representing a second location associated with the user at a second time, wherein the second time is later than the first time;
- (J) determining whether the second location is within the predetermined specified distance of the location of the particular event in the first event result set; and
- (K) checking the user out of the particular event in response to determining that the second location is not within the predetermined specified distance of the location of the particular event.

42. The computer-readable medium of claim 25:
wherein (B) comprises identifying first location data representing a plurality of locations associated with the user, wherein the plurality of locations includes the first location; and
wherein (E) further comprises, for each particular event within the first plurality of events:
- (E) (5) determining whether the particular event is near any of the plurality of locations; and
- (E) (6) including the particular event within the first event result set only if the particular event is determined to be near any of the plurality of locations.

\* \* \* \* \*